United States Patent
Takenaka

(10) Patent No.: US 11,794,708 B2
(45) Date of Patent: Oct. 24, 2023

(54) AUTOMATIC BRAKE DEVICE FOR INDUSTRIAL VEHICLE AND INDUSTRIAL, VEHICLE HAVING THE SAME

(71) Applicant: KABUSHIKI KAISHA TOYOTA JIDOSHOKKI, Kariya (JP)

(72) Inventor: Takaaki Takenaka, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 99 days.

(21) Appl. No.: 17/471,697

(22) Filed: Sep. 10, 2021

(65) Prior Publication Data
US 2022/0080936 A1   Mar. 17, 2022

(30) Foreign Application Priority Data
Sep. 17, 2020   (JP) ................... 2020-156107

(51) Int. Cl.
*B60T 13/62*   (2006.01)
*B60T 7/06*   (2006.01)
(Continued)

(52) U.S. Cl.
CPC ............... *B60T 13/62* (2013.01); *B60T 7/06* (2013.01); *B60T 7/12* (2013.01); *B60T 11/16* (2013.01)

(58) Field of Classification Search
CPC ..... B60T 7/04; B60T 7/06; B60T 7/12; B60T 11/16; B60T 11/18; B60T 13/62; B60T 13/74; B60T 13/745
See application file for complete search history.

(56) References Cited

U.S. PATENT DOCUMENTS 3,549,209 A * 12/1970 Moericke .................. B60T 7/12
 303/177
3,612,619 A * 10/1971 Hayes ..................... B60T 13/20
 188/106 P
(Continued)

FOREIGN PATENT DOCUMENTS

EP   3 689 691 A1   8/2020
JP   10278759 A * 10/1998   ................ B60T 7/04
(Continued)

OTHER PUBLICATIONS

Machine translation, JP 10-278759 A. (Year: 1998).*

*Primary Examiner* — Thomas J Williams
(74) *Attorney, Agent, or Firm* — Sughrue Mion, PLLC

(57) ABSTRACT

An automatic brake device for an industrial vehicle includes a brake pedal, a brake master cylinder, and an actuator that is operated during automatically braking, and configured to generate brake pressure in the brake master cylinder. The automatic brake device includes a first pivotable link member and a second pivotable link member. The brake pedal includes a pedal-side contact portion. The second pivotable link member includes a second link-side contact portion. The first pivotable link member includes a first contacted portion and a second contacted portion. The first pivotable link member is pivoted by the pedal-side contact portion pressing the first contacted portion while the brake pedal is stepped on, and pivoted by the second contacted portion pressing the second contacted portion while the actuator is operated.

8 Claims, 7 Drawing Sheets

(51) Int. Cl.
*B60T 7/12* (2006.01)
*B60T 11/16* (2006.01)

(56) References Cited

U.S. PATENT DOCUMENTS

| | | | | |
|---|---|---|---|---|
| 3,807,253 A | * | 4/1974 | Belzile | B60T 7/06 |
| | | | | 74/520 |
| 2022/0080936 A1 | * | 3/2022 | Takenaka | B60T 8/32 |

FOREIGN PATENT DOCUMENTS

| | | | | |
|---|---|---|---|---|
| JP | 11-208429 A | | 8/1999 | |
| JP | 2000272484 A | * | 10/2000 | B60T 7/02 |
| JP | 2000302017 A | * | 10/2000 | B60T 7/02 |
| JP | 2020-121689 A | | 8/2020 | |

* cited by examiner

AUTOMATIC BRAKE DEVICE FOR INDUSTRIAL VEHICLE AND INDUSTRIAL, VEHICLE HAVING THE SAME

CROSS-REFERENCE TO RELATED APPLICATION

This application claims priority to Japanese Patent Application No. 2020-156107 filed on Sep. 17, 2020, the entire disclosure of which is incorporated herein by reference.

BACKGROUND ART

The present disclosure relates to an automatic brake device for an industrial vehicle and the industrial vehicle having the same.

There is known an automatic brake device disclosed in Japanese Patent Application Publication No. H11-208429 as a conventional technique regarding an automatic brake device for an industrial vehicle and the industrial vehicle having the automatic brake device. The automatic brake device disclosed in the Publication includes a brake pedal and a lever that is separately provided from the brake pedal and connected to a push rod of a brake booster. When an operator steps on the brake pedal, the lever is rotated to push the push rod of the brake booster. Meanwhile, when the automatic brake device is operated, a coupling mechanism rotates only the lever with the brake pedal left at an initial position thereof. Thus, the operator does not feel something uncomfortable caused by the brake pedal that would not be positioned at a proper position when the operator tries to step on the brake pedal.

In the automatic brake device disclosed in Japanese Patent Application Publication No. H11-208429, the push rod of the brake booster is pulled during automatic braking. However, a driving source for pulling the push rod is not disclosed in the Publication. The push rod of the automatic brake device is pushed by the operation of the brake pedal. If the driving source for pulling the push rod is mounted in the automatic brake device, there is a problem that pushing the push rod causes external force to be applied to the driving source.

The present disclosure has been made in view of the above circumstances and is directed to providing an automatic brake device for an industrial vehicle wherein a brake pedal of the automatic brake device is not displaced during an operation of an automatic brake and external force is not applied to a driving source of the automatic brake by an operation of the brake pedal, and the industrial vehicle having the automatic brake device.

SUMMARY

In accordance with an aspect of the present disclosure, there is provided an automatic brake device for an industrial vehicle that includes a brake pedal that is pivotably supported by a bracket, a brake master cylinder in which brake pressure is generated by the brake pedal stepped on, and an actuator that is operated during automatically braking, and configured to generate brake pressure in the brake master cylinder. The automatic brake device includes a first pivotable link member that is coupled to the brake master cylinder, and a second pivotable link member that is coupled to the actuator. The brake pedal includes a pedal-side contact portion that is configured to pivot the first pivotable link member. The second pivotable link member includes a second link-side contact portion that is configured to pivot the first pivotable link member. The first pivotable link member includes a first contacted portion that is contactable with the pedal-side contact portion, and a second contacted portion that is contactable with the second link-side contact portion. The first pivotable link member is pivoted by the pedal-side contact portion pressing the first contacted portion while the brake pedal is stepped on, simultaneously the second contacted portion being moved away from the second link-side contact portion. The first pivotable link member is pivoted by the second contacted portion pressing the second contacted portion while the actuator is operated, simultaneously the first contacted portion being moved away from the pedal-side contact portion.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, with objects and advantages thereof, may best be understood by reference to the following description of the embodiments with the accompanying drawings in which:

FIG. 6 is a side view of the automatic brake device while a brake pedal is stepped on.

DETAILED DESCRIPTION OF THE EMBODIMENTS

The following will describe an automatic brake device for an industrial vehicle and the industrial vehicle having the automatic brake device according to an embodiment of the present disclosure with reference to the drawings. The automatic brake device in the present embodiment is applied to a towing tractor as an industrial vehicle. It is noted that expressions "front and rear", "right and left", and "upper and lower" for identifying directions are determined based on a state in which an operator of the towing tractor sitting on a driver's seat in a driver's cab faces in a direction in which the towing tractor travels forward.

Figure 1:
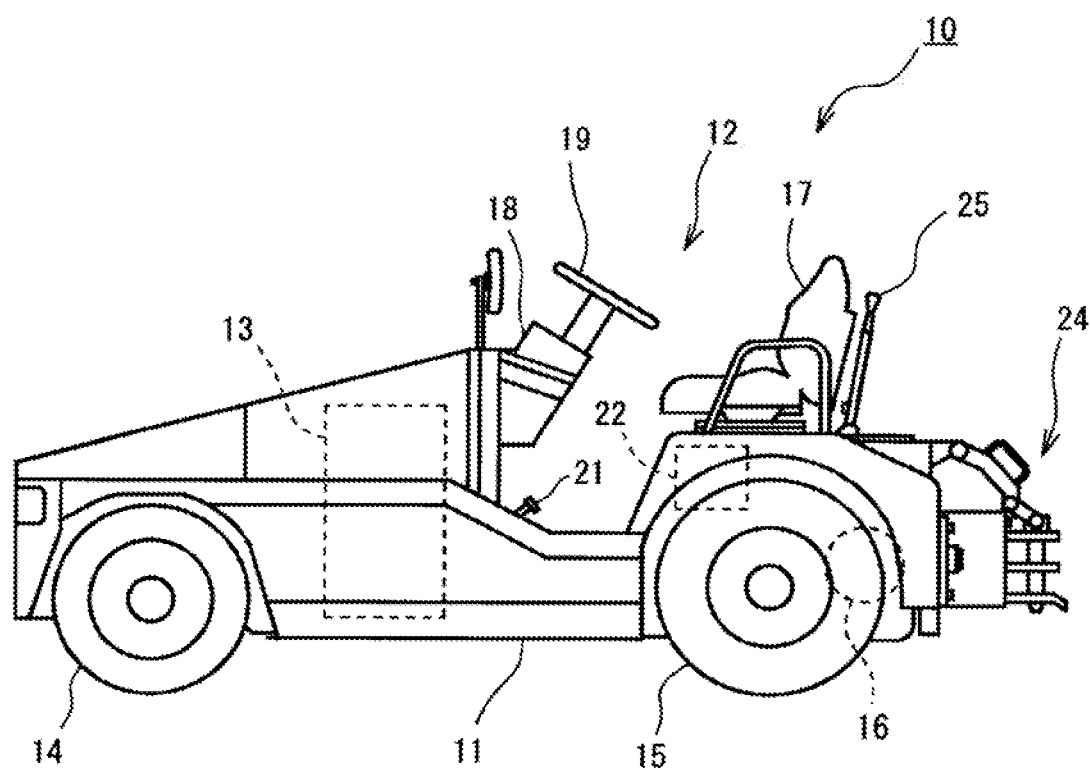
FIG. 1 is a side view of a towing tractor according to an embodiment of the present disclosure.

As illustrated in FIG. 1, a towing tractor 10 as a towing vehicle includes a vehicle body 11. A driver's cab 12 is provided in a middle of the vehicle body 11, and a battery 13 is mounted on a front side of the driver's cab 12 and accommodated in the vehicle body 11. The vehicle body 11 has on a front portion thereof steered wheels 14 as front wheels and on a rear portion thereof driving wheels 15 as rear wheels. The vehicle body 11 has a traveling motor 16 as a driving device for traveling, and the traveling motor 16 generates a driving force for traveling. A power transmitting mechanism (not illustrated) that transmits the driving force of the traveling motor 16 to the driving wheels 15 is installed between the traveling motor 16 and the driving wheels 15. The towing tractor 10 of the present embodiment is a battery-type towing tractor that travels by an electric power of the battery 13 mounted on the vehicle body 11.

The driver's cab 12 in the vehicle body 11 includes driver's seats 17 on which an operator sits, and the driver's seats 17 are arranged in a right and left direction of the vehicle body 11. In FIG. 1, just one driver's seat 17 is illustrated. A steering column 18 is provided on a front side of the driver's seats 17. A steering wheel 19 for changing a steering angle of the steered wheels 14 is attached to the steering column 18.

An accelerator pedal (not illustrated) is provided on a floor surface on the front side of the driver's seats 17. The towing tractor 10 controls the driving of the traveling motor 16 so that a vehicle speed of the towing tractor 10 corresponds to a stepping amount of the accelerator pedal by the operator. A brake pedal 21 is also provided on the floor surface on the front side of the driver's seats 17. The brake pedal 21 is a part of an automatic brake device 20, and stepped on to cause the automatic brake device 20 to generate brake force. The details of the automatic brake device 20 including the brake pedal 21 will be described later.

The vehicle body 11 has a controller 22 mounted under the driver's seats 17, and the controller 22 performs a variety of controls of the towing tractor 10. The controller 22 has an arithmetic processing section (CPU) that executes a variety of programs, a storage section that stores the variety of programs and data, an input section into which signals from sensors, or the like are input, and an output section from which command signals to each unit are output (not illustrated).

The vehicle body 11 has on the rear portion thereof a drawbar device 24 that is coupled to a towed vehicle such as a cart. A drawbar operation lever 25 is provided on a rear side of the driver's seats 17. The operator operates the drawbar operation lever 25 to couple the drawbar device 24 with or uncouple it from the towed vehicle. The drawbar operation lever 25 is positioned within a range in which the operator sitting on the driver's seats 17 can grip the drawbar operation lever 25. In addition, the vehicle body 11 has on the rear portion thereof an inching operation unit (not illustrated) for inching operation in which a position of the towing tractor 10 is adjusted back and forth relative to the vehicle to be towed. The operator leaves the driver's cab 12 and operates the inching operation unit to adjust the position of the towing tractor 10 back and forth so that the towing tractor 10 and the cart have an appropriate space for coupling therebetween.

Figure 2:
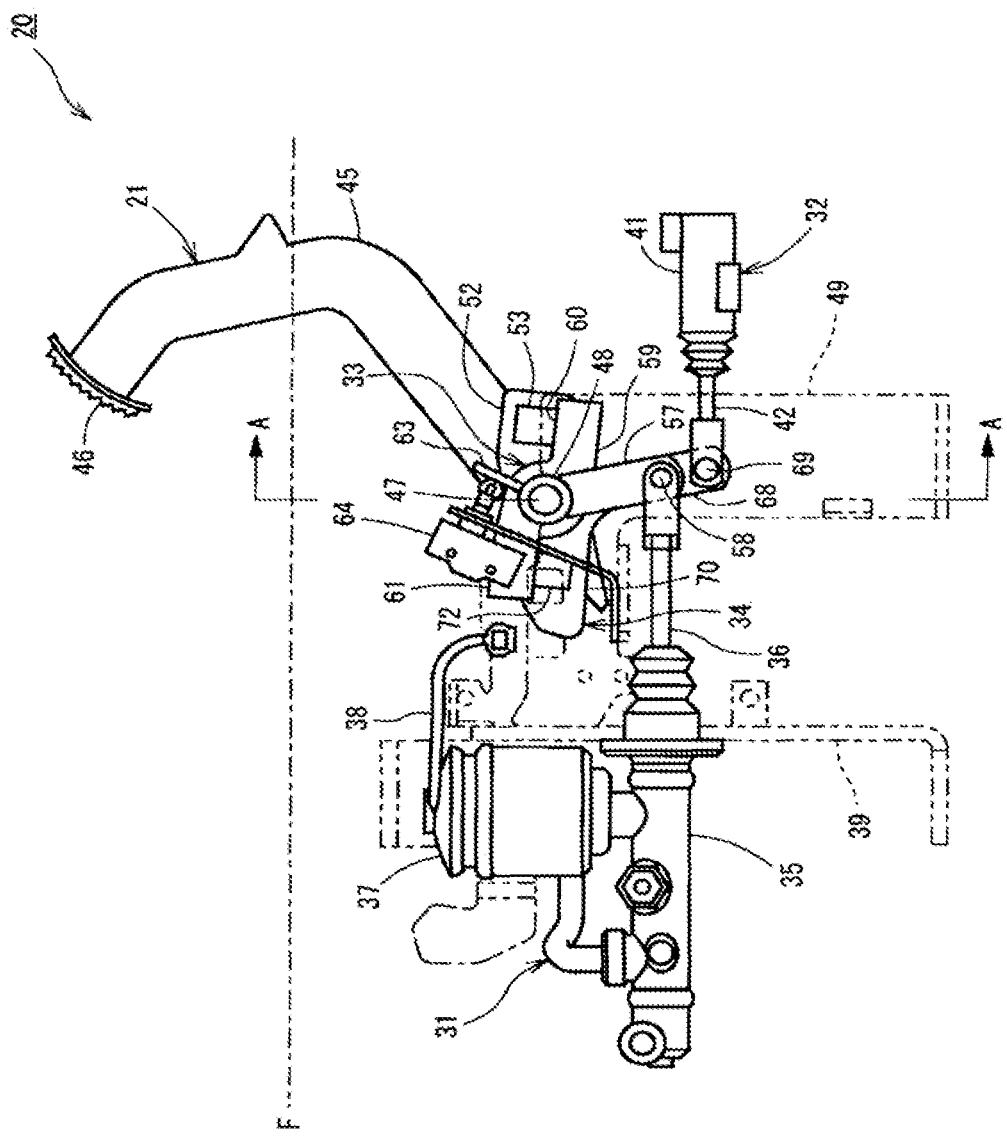
FIG. 2 is a side view illustrating an automatic brake device according to the embodiment of the present disclosure.
Figure 3:
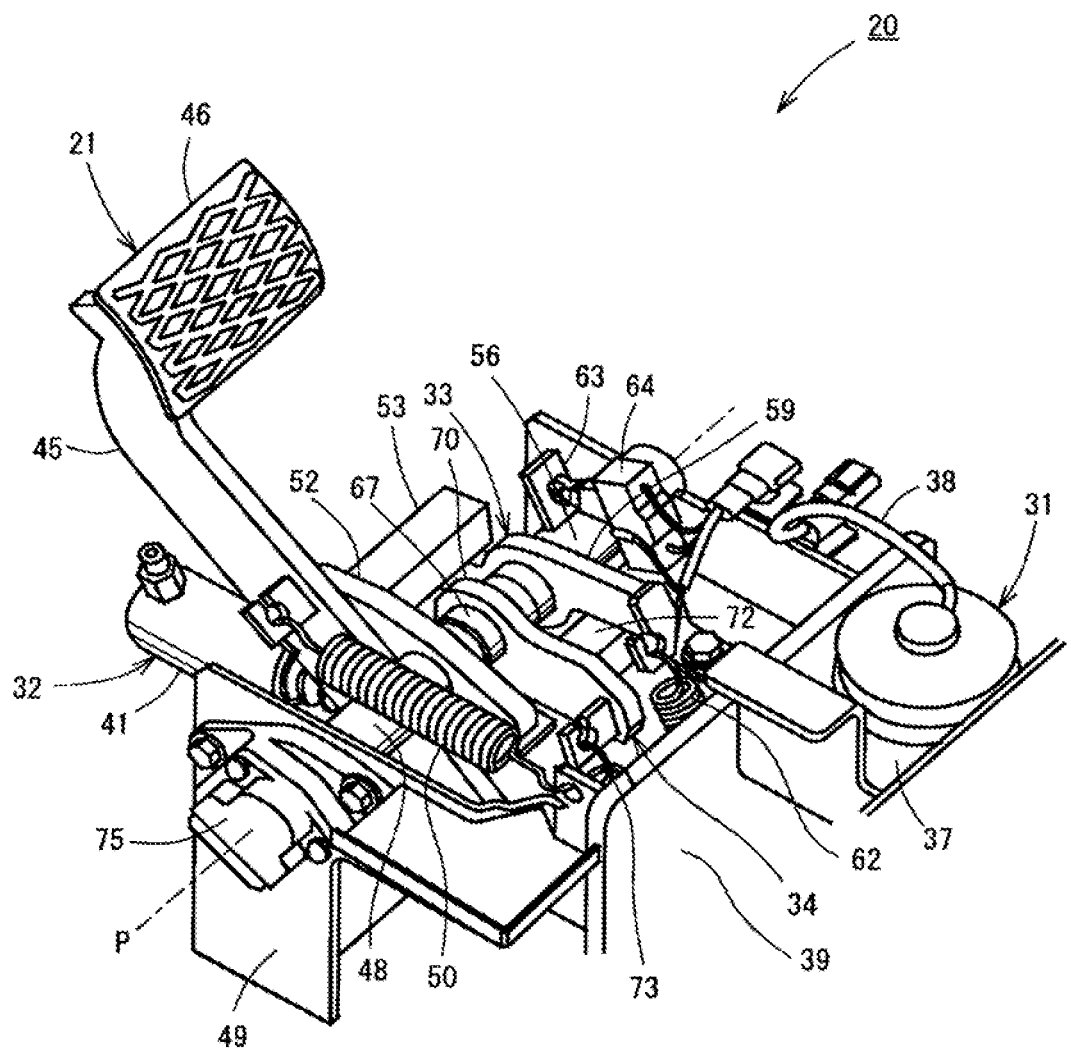
FIG. 3 is a perspective view illustrating a main part of the automatic brake device according to the embodiment of the present disclosure.

Next, the details of the automatic brake device 20 will be described. The automatic brake device 20 has a function of automatically obtaining brake force when certain conditions are satisfied as well as the function of obtaining brake force by an operation of the brake pedal 21. As illustrated in FIGS. 2 and 3, the automatic brake device 20 has a brake pedal 21, a brake master cylinder 31, a hydraulic cylinder 32, a first link member 33, and a second link member 34. The hydraulic cylinder 32 corresponds to an actuator in the present disclosure. The first link member 33 and the second link member 34 correspond to a first pivotable link member and a second pivotable link member in the present disclosure, respectively.

Firstly, the brake master cylinder 31 will be described. Hydraulic fluid in the brake master cylinder 31 has brake pressure during the operation of the brake pedal 21 (that is, the operation in which the brake pedal 21 is stepped on by an operator) and automatic braking. The brake master cylinder 31 has a cylinder body 35; a rod 36 that is coupled to the first link member 33, and extends or contracts relative to the cylinder body 35; a reserve tank 37 that is connected to the cylinder body 35; and a wiring harness 38 of a brake oil level switch that is connected to the reserve tank 37. The cylinder body 35 is connected to a brake cylinder (not illustrated) that applies brakes to the steered wheels 14 and the driving wheels 15 through hydraulic pipes. In the present embodiment, the brake master cylinder 31 is supported by a bracket 39 for the brake master cylinder 31 in such a manner that the rod 36 is positioned on a front side of the brake master cylinder 31. The bracket 39 is provided under the floor surface of the vehicle body 11. It is noted that a long dashed short dashed line F drawn in FIG. 2 indicates a height of the floor surface of the vehicle body 11 in the driver's cab 12.

In the brake master cylinder 31, when the rod 36 is pushed into the cylinder body 35, hydraulic fluid in the reserve tank 37 is pressurized, thereby generating brake force. The pressurized hydraulic pressure operates the brake cylinder that applies brakes to the steered wheels 14 and the driving wheels 15.

Next, the hydraulic cylinder 32 will be described. The hydraulic cylinder 32 serves as a driving source of the automatic brake device 20, and is operated in response to a command from the controller 22 during automatic braking. The hydraulic cylinder 32 has a cylinder body 41 and a rod 42 that is coupled to the second link member 34 and extends or contracts relative to the cylinder body 41. In the present embodiment, the hydraulic cylinder 32 is supported by a bracket 43 (see FIG. 4) in such a manner that the rod 42 is positioned on a rear side of the hydraulic cylinder 32. The bracket 43 is provided under the floor surface of the vehicle body 11. The controller 22 controls a hydraulic valve (not illustrated) to operate the hydraulic cylinder 32 by the controlled hydraulic pressure through the hydraulic valve, so that the rod 42 extends or contracts.

Next, the details of the brake pedal 21 will be described. The brake pedal 21 has a pedal arm 45 and a pedal plate 46. The pedal arm 45 has on a base end portion thereof a boss portion 48 through which a pivot shaft 47 is inserted. The pivot shaft 47 is rotatably supported by a bracket 49 for the brake pedal 21, and the bracket 49 is provided under the floor surface of the vehicle body 11. Thus, the brake pedal 21 is pivotably supported by the bracket 49. A central axis P of the pivot shaft 47 serves as a pivot center of the brake pedal 21, the first link member 33, and the second link member 34. The pivot shaft 47 pivotably supports the brake pedal 21, the first link member 33, and the second link member 34. The pedal plate 46 is attached to a tip end portion of the pedal arm 45. The pedal plate 46 is stepped on by the operator.

As illustrated in FIG. 3, one end portion of a return spring 50 is engaged with the pedal arm 45 so that the return spring 50 is positioned between the boss portion 48 and the pedal plate 46. The return spring 50 serves as an urging member for the brake pedal 21, and is a coil spring in the present embodiment. When the brake pedal 21 is released, the return spring 50 returns the brake pedal 21 to a position where the brake pedal 21 is located before stepped on. The other end portion of the return spring 50 is engaged with the bracket 39 for the brake master cylinder 31. The bracket 39 is positioned on a rear side of the bracket 49.

The boss portion 48 includes an arm plate 52 that extends in a front and rear direction. The arm plate 52 has on an front end portion thereof a prismatic rod 53 that extends along the central axis P of the pivot shaft 47 and corresponds to a pedal-side contact portion in the present disclosure. When the brake pedal 21 is stepped on, the prismatic rod 53 presses the first link member 33 described below so as to pivot the first link member 33. The prismatic rod 53 is positioned on a front side of the boss portion 48, that is, separately provided from the pivot shaft 47.

Figure 4:
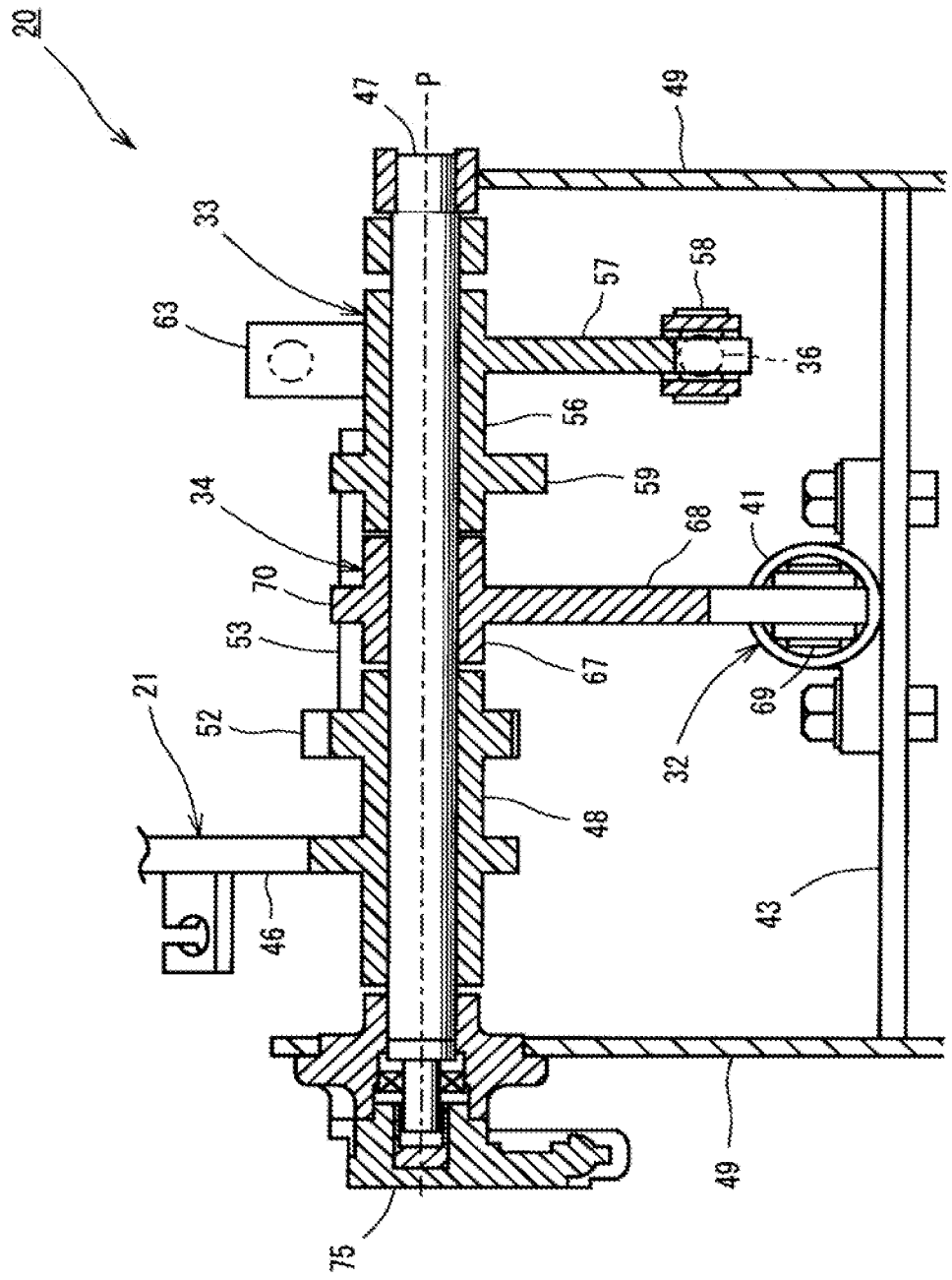
FIG. 4 is a view as viewed in a direction of arrows A, A of FIG. 2.
Figure 5:
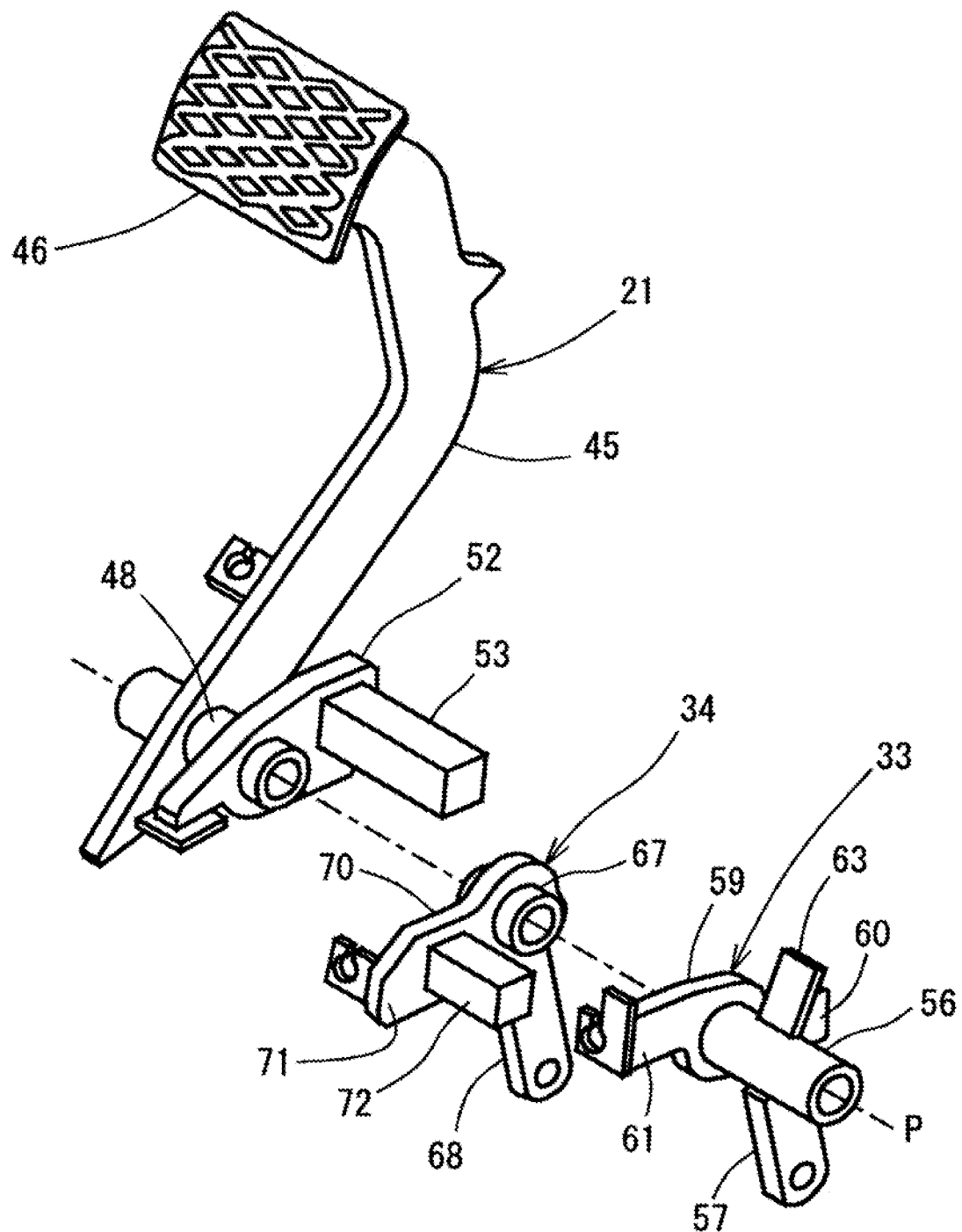
FIG. 5 is an exploded perspective view illustrating the main part of the automatic brake device.

Next, the first link member 33 will be described. The first link member 33 is coupled to the brake master cylinder 31 and pivoted with the pivot shaft 47 to generate brake pressure in the brake master cylinder 31. As illustrated in FIGS. 3, 4, and 5, the first link member 33 is positioned on a right side of the brake pedal 21 and the second link member 34 in a direction along the central axis P. The first link member 33 has a cylindrical body 56 through which the pivot shaft 47 is inserted and that is fixed to the pivot shaft 47. As illustrated in FIG. 5, the cylindrical body 56 includes a link arm 57 that extends downward. A tip end portion of the link arm 57 is pivotably supported with a tip end portion of the rod 36 of the brake master cylinder 31 by a pin 58 (see FIG. 2).

The cylindrical body 56 includes an arm plate 59 that extends in the front and rear direction. As illustrated in FIG. 2, a front end portion 60 of the arm plate 59 is positioned under the prismatic rod 53, which presses the front end portion 60 of the arm plate 59 when the brake pedal 21 is stepped on. The front end portion 60 provided on the first link member 33 is positioned radially outwardly away from the pivot shaft 47 to interfere with a pivoting track of the prismatic rod 53 of the brake pedal 21. The front end portion 60 of the arm plate 59 corresponds to a first contacted portion that is contactable with the prismatic rod 53 in the present disclosure. A rear end portion 61 of the arm plate 59 extends rearward, and corresponds to a second contacted portion that is contactable with the second link member 34 in the present disclosure. The front end portion 60 is positioned on a front side of the pivot shaft 47 and separately provided from the pivot shaft 47, whereas the rear end portion 61 is positioned on a rear side of the pivot shaft 47 and separately provided from the pivot shaft 47. As illustrated in FIG. 3, one end portion of a return spring 62 is engaged with the rear end portion 61. The return spring 62 serves as an urging member for the first link member 33, and is a coil spring in the present embodiment. The return spring 62 returns the first link member 33 to a position where the first link member 33 is located before pivoted. The other end portion of the return spring 62 is engaged with the bracket 39 for the brake master cylinder 31, although the illustration is omitted.

As illustrated in FIGS. 2 and 3, the cylindrical body 56 includes a plate piece 63 that extends forward and obliquely upward. The plate piece 63 faces a switch 64 for a brake lamp, and switches ON and OFF states of the switch 64. The switch 64 is connected to the controller 22. In a state where the first link member 33 is not pivoted, the plate piece 63 is in contact with the switch 64 to set the switch 64 to the OFF state. When the switch 64 is in the OFF state, the brake lamp (not illustrated) is not turned on. In a state where the first link member 33 is pivoted, the plate piece 63 moves away from the switch 64 to set the switch 64 to the ON state, so that the brake lamp is turned on.

Next, the second link member 34 will be described. The second link member 34 is coupled to the hydraulic cylinder 32 as the actuator. The second link member 34 pivots around the pivot shaft 47, thereby pivoting the first link member 33 so as to generate brake pressure in the brake master cylinder 31. That is, the hydraulic cylinder 32 generates the hydraulic pressure in the brake master cylinder 31 via the first link member 33 and the second link member 34. As illustrated in FIGS. 3 and 4, the second link member 34 is positioned between the brake pedal 21 and the first link member 33 in the direction along the central axis P. The second link member 34 has a cylindrical body 67 through which the pivot shaft 47 is inserted. As illustrated in FIG. 5, the cylindrical body 67 includes a link arm 68 that extends downward. As illustrated in FIG. 2, a tip end portion of the link arm 68 is pivotably supported with a tip end portion of the rod 42 of the hydraulic cylinder 32 by a pin 69. While the brake pressure is not generated in the brake master cylinder 31, a line between the central axis P and a center of the pin 69 and a line between the central axis P and a center of the pin 58 have the same direction.

The cylindrical body 67 includes an arm plate 70 that extends rearward. The arm plate 70 has on a rear end portion 71 thereof a prismatic rod 72 that extends along the central axis P of the pivot shaft 47 and corresponds to a second link-side contact portion in the present disclosure. The prismatic rod 72 is positioned under the rear end portion 61 of the arm plate 59 of the first link member 33. When the second link member 34 is pivoted by the operation of the hydraulic cylinder 32, the prismatic rod 72 presses the rear end portion 61 to pivot the first link member 33. The prismatic rod 72 is positioned on the rear side of the pivot shaft 47 and separately provided from the pivot shaft 47. Accordingly, the rear end portion 61 of the first link member 33 provided on the first link member 33 is positioned radially outwardly away from the pivot shaft 47 to interfere with a pivoting track of the prismatic rod 72 of the second link member 34.

One end portion of a return spring 73 is engaged with the rear end portion 71 (see FIG. 3). The return spring 73 serves as an urging member for the second link member 34, and is a coil spring in the present embodiment. The return spring 62 returns the second link member 34 to a position where the second link member 34 is located before pivoted by the operation of the hydraulic cylinder 32. The other end portion of the return spring 73 is engaged with the bracket 39 for the brake master cylinder 31, although the illustration is omitted.

The first link member 33 is pivoted with the pivot shaft 47. When the first link member 33 is pivoted, the brake force is generated in the brake master cylinder 31. Accordingly, it is possible to estimate the brake pressure generated in the brake master cylinder 31 by detecting an amount of pivoting of the pivot shaft 47. As illustrated in FIGS. 3 and 4, the automatic brake device 20 in the present embodiment includes a pivot amount detector 75 that detects the amount of pivoting of the pivot shaft 47. The pivot amount detector 75 is a potentiometer in the present embodiment, and provided near the brake pedal 21 in the bracket 49. The brake force becomes larger as the detected amount of pivoting of the pivot shaft 47 becomes larger.

The following will describe an operation of the automatic brake device 20 according to the present embodiment. As illustrated in FIG. 2, while the brake pressure is not generated in the brake master cylinder 31, the rod 36 of the brake master cylinder 31 extends, whereas the rod 42 of the hydraulic cylinder 32 contracts. Here, the switch 64 is pressed by the plate piece 63 and set to the OFF state, so that the brake lamp is not turned on.

Figure 6:
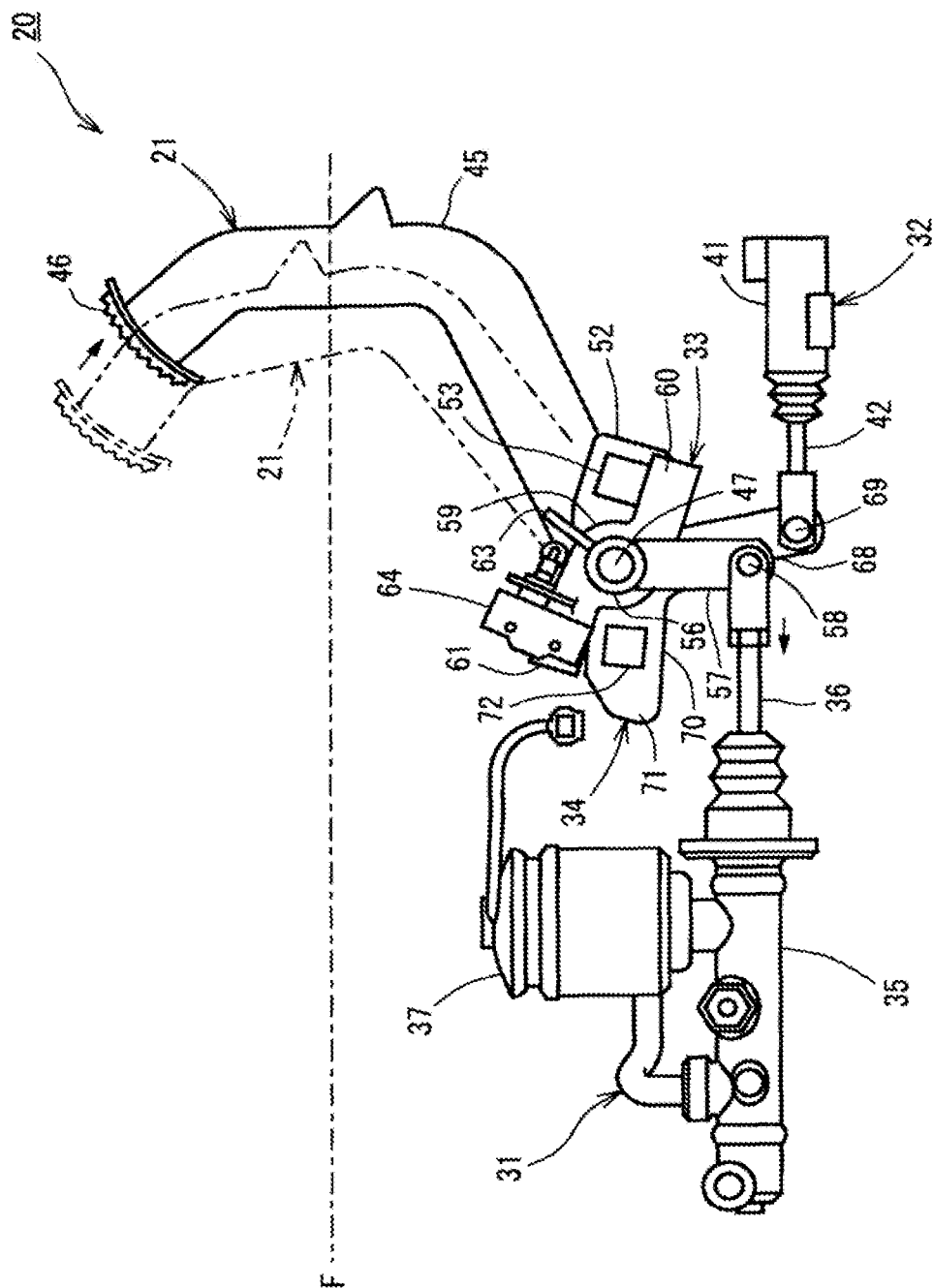

The following will describe the braking by the operation of the brake pedal 21 with reference to FIG. 6. When the operator steps on the brake pedal 21, the brake pedal 21 is pivoted around the central axis P toward a direction (toward a clockwise direction in FIG. 6) in which the pedal plate 46 approaches the floor surface of the vehicle body 11. The prismatic rod 53 presses the front end portion 60 of the arm plate 59 of the first link member 33 from an upper side of the front end portion 60 by the pivoting of the brake pedal 21, so that the first link member 33 is pivoted around the central axis P with the brake pedal 21. That is, while the brake pedal 21 is stepped on, the first link member 33 is pivoted by the prismatic rod 53 pressing the front end portion 60 of the arm plate 59. Simultaneously, the rear end portion 61 of the arm plate 59 moves away from the prismatic rod 72 of the second link member 34. Thus, even when the first link member 33 is pivoted by the brake pedal 21, the second link member 34 is not pivoted.

In the first link member 33 pivoted with the brake pedal 21, the tip end portion of the link arm 57 is displaced rearward by the pivoting, so that the rod 36 of the brake master cylinder 31 is pushed into the cylinder body 35. Brake pressure is generated in the brake master cylinder 31 by the rod 36 pushed into the cylinder body 35. Accordingly, as long as the towing tractor 10 travels, brake force is applied to the driving wheels 15, with the result that the towing tractor 10 stops traveling. Here, the plate piece 63 moves away from the switch 64 and the switch 64 is set to the ON state, so that the brake lamp is turned on.

When the brake pedal 21 is released, the brake pedal 21 is, by the urging force of the return spring 50, pivoted around the central axis P toward a direction (toward a counter-clockwise direction in FIG. 6) opposite to the direction in which the brake pedal 21 is pivoted during stepped on, so that the brake pedal 21 is returned to the position where the brake pedal 21 is located before stepped on. In addition, the release of the brake pedal 21 returns the first link member 33 by the urging force of the return spring 62 to the position where the first link member 33 is located before pivoted. Thus, the rod 36 of the brake master cylinder 31 extends, and the brake pressure generated in the brake master cylinder 31 disappears.

Figure 7:
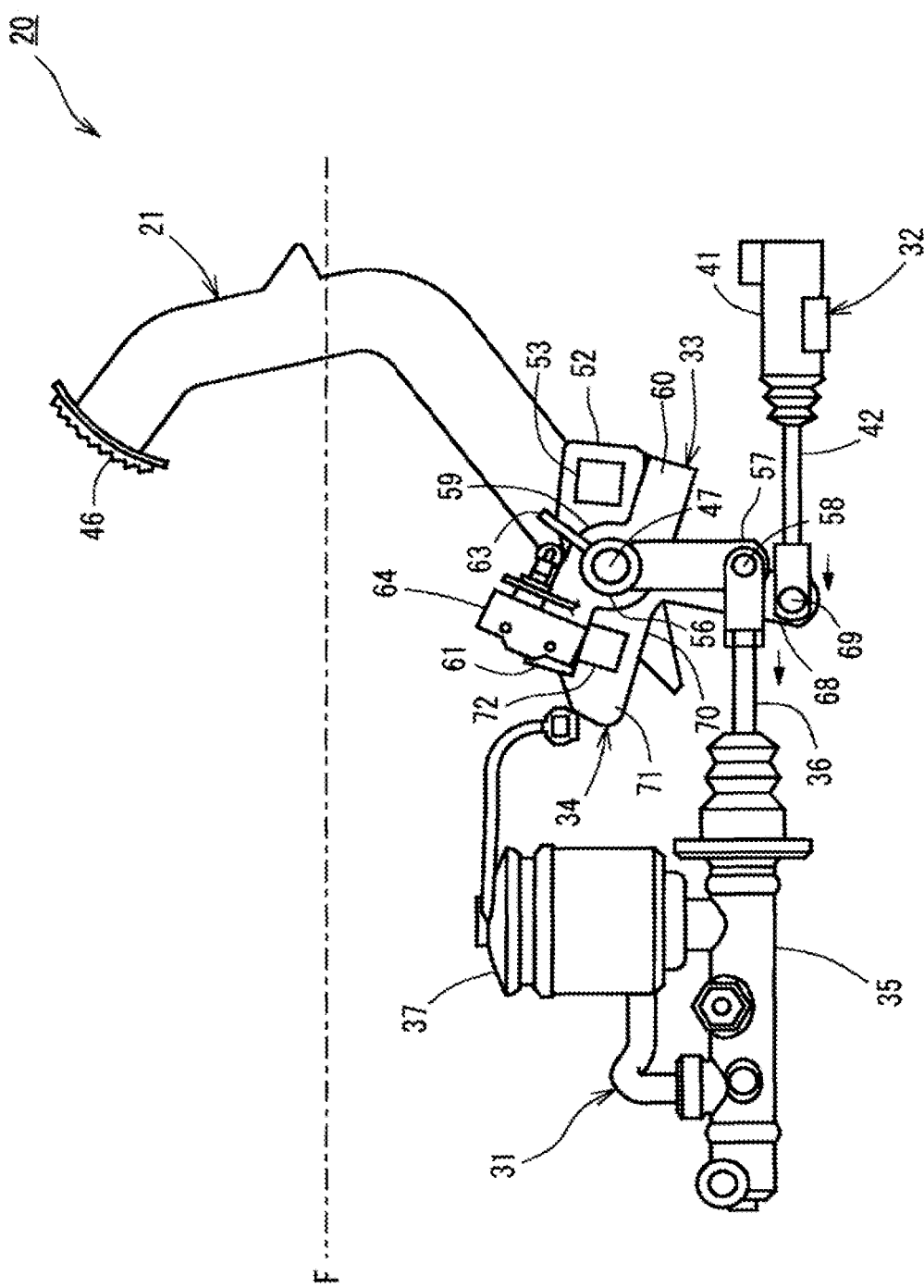
FIG. 7 is a side view of the automatic brake device during automatic braking.

The following will describe the automatically braking by the control of the controller 22, not depending on the operation of the brake pedal 21, with reference to FIG. 7. When the condition in which the automatically braking is operated is satisfied, the controller 22 outputs a command for operating the hydraulic cylinder 32. The hydraulic cylinder 32 is operated by the command from the controller 22, and the rod 42 extends. The second link member 34 is, by the extension of the rod 42, pivoted around the central axis P toward a direction (in a clockwise direction in FIG. 7) in which an end of the arm plate 70 is displaced rearward. The prismatic rod 72 presses the rear end portion 61 of the arm plate 59 of the first link member 33 from a lower side of the rear end portion 61 by the pivoting of the second link member 34, so that the first link member 33 is pivoted around the central axis P with the second link member 34. That is, while the hydraulic cylinder 32 is operated, the first link member 33 is pivoted by the prismatic rod 72 pressing the rear end portion 61 of the arm plate 59. Simultaneously, the front end portion 60 of the arm plate 59 moves away from the prismatic rod 53 of the brake pedal 21. Thus, even when the first link member 33 is pivoted by the second link member 34, the brake pedal 21 is not pivoted.

In the first link member 33 pivoted with the second link member 34, the tip end portion of the link arm 57 is displaced rearward by the pivoting, so that the rod 36 of the brake master cylinder 31 is pushed into the cylinder body 35. Brake pressure is generated in the brake master cylinder 31 by the rod 36 pushed into the cylinder body 35. Accordingly, as long as the towing tractor 10 travels, brake force is applied to the driving wheels 15, with the result that the towing tractor 10 stops traveling. Here, the plate piece 63 moves away from the switch 64 and the switch 64 is set to the ON state, so that the brake lamp is turned on. The condition in which the automatically braking is operated may be set as desired by the controller 22 of the towing tractor 10.

When the operation of the hydraulic cylinder 32 is stopped, the second link member 34 is, by the urging force of the return spring 73, pivoted around the central axis P toward a direction (toward a counter-clockwise direction in FIG. 7) opposite to the direction in which the second link member 34 is pivoted during the operation of the hydraulic cylinder 32, so that the second link member 34 is returned to the position where the second link member 34 is located before the hydraulic cylinder 32 is operated. In addition, the first link member 33 is returned by the urging force of the return spring 62 to the position where the first link member 33 is located before pivoted, and the rod 42 of the hydraulic cylinder 32 contracts. Thus, the rod 36 of the brake master cylinder 31 extends, and the brake pressure generated in the brake master cylinder 31 disappears.

In the automatic brake device 20 and the towing tractor 10 of the present embodiment, the pivot amount detector 75 detects an amount of pivoting of the pivot shaft 47. The controller 22 estimates the brake pressure generated in the brake master cylinder 31 based on the detected amount of pivoting of the pivot shaft 47.

The automatic brake device 20 and the towing tractor 10 according to the present embodiment provide the following advantageous effects.

(1) When the brake pedal 21 is stepped on by the operator, the brake pedal 21 is pivoted, so that the prismatic rod 53 presses the front end portion 60 of the arm plate 59 of the first link member 33, the prismatic rod 53 and the front end portion 60 corresponding to the pedal-side contact portion and the first contacted portion in the present disclosure, respectively. The brake pedal 21 is further pivoted, thereby further pivoting the first link member 33, with the result that brake force is generated in the brake master cylinder 31. The pivoting of the first link member 33 by the stepping of the brake pedal 21 moves the rear end portion 61 of the arm plate 59 of the first link member 33 away from the prismatic rod 72 of the second link member 34. Thus, since the second link member 34 is not pivoted, external force is not applied to the hydraulic cylinder 32. The hydraulic cylinder 32 is operated to pivot the second link member 34 during the automatic braking, so that the prismatic rod 72 of the second link member 34 presses the rear end portion 61 of the first link member 33, the prismatic rod 72 and the rear end portion 61 corresponding to the second link-side contact portion and the second contacted portion, respectively. The second link member 34 is further pivoted by the hydraulic cylinder 32, thereby further pivoting the first link member 33, with the result that brake force is generated in the brake master cylinder 31. The pivoting of the second link member 34 by the operation of the hydraulic cylinder 32 moves the front end portion 60 of the first link member 33 away from the prismatic rod 53 of the brake pedal 21. Thus, the brake pedal 21 is not pivoted. Therefore, the operator does not feel something uncomfortable caused by the brake pedal 21 which would be pivoted during the automatically braking, and while the operator steps on the brake pedal 21, the actuator is not damaged.

(2) The hydraulic cylinder 32 is used as the actuator of the present embodiment. When the towing tractor 10 includes a hydraulic circuit, the actuator may be realized by the hydraulic cylinder 32 that utilizes hydraulic pressure. In addition, because the external force is not applied to the hydraulic cylinder 32 during the operation of the brake pedal 21, the hydraulic cylinder 32 is not damaged by the external force.

(3) The first link member 33 is fixed to the pivot shaft 47 and pivotable with the pivot shaft 47, and the automatic brake device 20 includes the pivot amount detector 75 that detects the amount of pivoting of the pivot shaft 47. With this configuration, the amount of pivoting of the pivot shaft 47 is detected by the pivot amount detector 75. Therefore, the brake force is detected during the operation of the brake pedal 21 and the automatically braking based on the amount of pivoting of the pivot shaft 47, which is detected by the pivot amount detector 75. This means that an amount of pivoting of the brake pedal 21 does not need to be detected so as to estimate the brake force.

(4) The front end portion 60 of the arm plate 59 of the first link member 33 provided on the first link member 33 is positioned radially outwardly away from the pivot shaft 47 to interfere with the pivoting track of the prismatic rod 53 of the brake pedal 21. In addition, the rear end portion 61 of the arm plate 59 provided on the first link member 33 is positioned radially outwardly away from the pivot shaft 47 to interfere with the pivoting track of the prismatic rod 72 of the second link member 34. These mean that all of the prismatic rod 53 of the brake pedal 21, the front end portion 60 of the first link member 33, the prismatic rod 72 of the second link member 34, and the rear end portion 61 of the first link member 33 are separately provided from the pivot shaft 47 in a radial direction of the pivot shaft 47. Thus, each of the prismatic rod 53, the prismatic rod 72, the front end portion 60, and the rear end portion 61 may obtain a predetermined moment by relatively small force applied to them, and excessive load is difficult for them to receive. Therefore, durability of these members that pivot around the central axis P of the pivot shaft 47 may be improved.

The present disclosure is not limited to the specific embodiment described above, and may appropriately be modified within the gist of the present disclosure. For example, the following modifications may be allowed.

In the above-described embodiment, the hydraulic cylinder is exemplified as the actuator; however, the present disclosure is not limited thereto. The actuator may be an air cylinder or an electric actuator such as an electric motor.

In the above-described embodiment, the automatic brake device includes the pivot amount detector that detects an amount of pivoting of the pivot shaft; however, the present disclosure is not limited thereto. The pivot amount detector is not necessarily required in the configuration of the automatic brake device. The automatic brake device may have a configuration not including the pivot amount detector.

In the above-described embodiment, the prismatic rods are used for forming the pedal-side contact portion and the second link-side contact portion; however, the pedal-side contact portion and the second link-side contact portion are not limited to the prismatic rods. As long as the pedal-side contact portion is contactable with the first contacted portion and the second link-side contact portion is contactable with the second contacted portion, configurations and shapes of the pedal-side contact portion and the second link-side contact portion may be changed as desired.

In the above-described embodiment, the second link member 34 is positioned between the brake pedal 21 and the first link member 33 in the direction along the central axis P; however, the present disclosure is not limited thereto. For example, the first link member 33 may be positioned between the brake pedal 21 and the second link member 34 in the direction along the central axis P.

In the above-described embodiment (and the modifications), the towing tractor is exemplified as the industrial vehicle; however, the present disclosure is not limited thereto. For example, the industrial vehicle may be a forklift or a towing vehicle other than the towing tractor.

What is claimed is:

1. An automatic brake device for an industrial vehicle comprising:
    a brake pedal that is pivotably supported by a bracket;
    a brake master cylinder in which brake pressure is generated by the brake pedal stepped on; and
    an actuator that is operated during automatically braking, and configured to generate brake pressure in the brake master cylinder, wherein
    the automatic brake device includes:
        a first pivotable link member that is coupled to the brake master cylinder; and
        a second pivotable link member that is coupled to the actuator,
    the brake pedal includes a pedal-side contact portion that is configured to pivot the first pivotable link member,
    the second pivotable link member includes a second link-side contact portion that is configured to pivot the first pivotable link member,
    the first pivotable link member includes:
        a first contacted portion that is contactable with the pedal-side contact portion; and
        a second contacted portion that is contactable with the second link-side contact portion,
    the first pivotable link member is pivoted by the pedal-side contact portion pressing the first contacted portion while the brake pedal is stepped on, simultaneously the second contacted portion being moved away from the second link-side contact portion, and
    the first pivotable link member is pivoted by the second link-side contact portion pressing the second contacted portion while the actuator is operated, simultaneously the first contacted portion being moved away from the pedal-side contact portion, and
wherein
    the automatic brake device includes a pivot shaft that pivotably supports the brake pedal, the first pivotable link member, and the second pivotable link member,
    the first pivotable link member is fixed to the pivot shaft and pivotable with the pivot shaft, and
    the automatic brake device further includes a pivot amount detector that is configured to detect an amount of pivoting of the pivot shaft.

2. The automatic brake device for the industrial vehicle according to claim 1, wherein the actuator is a hydraulic cylinder.

3. An industrial vehicle comprising
the automatic brake device according to claim 2.

4. The automatic brake device for the industrial vehicle according to claim 1, wherein
    the first contacted portion provided on the first pivotable link member is positioned radially outwardly away from the pivot shaft to interfere with a pivoting track of the pedal-side contact portion, and
    the second contacted portion provided on the first pivotable link member is positioned radially outwardly away from the pivot shaft to interfere with a pivoting track of the second link-side contact portion.

5. An industrial vehicle comprising
the automatic brake device according to claim 4.

6. An industrial vehicle comprising
the automatic brake device according to claim 1.

7. An industrial vehicle comprising
the automatic brake device according to claim 1.

8. An automatic brake device for an industrial vehicle comprising:
- a brake pedal that is pivotably supported by a bracket;
- a brake master cylinder in which brake pressure is generated by the brake pedal stepped on; and
- an actuator that is operated during automatically braking, and configured to generate brake pressure in the brake master cylinder, wherein the automatic brake device includes:
- a first pivotable link member that is coupled to the brake master cylinder; and
- a second pivotable link member that is coupled to the actuator, the brake pedal includes a pedal-side contact portion that is configured to pivot the first pivotable link member, the second pivotable link member includes a second link-side contact portion that is configured to pivot the first pivotable link member, the first pivotable link member includes:
- a first contacted portion that is contactable with the pedal-side contact portion; and
- a second contacted portion that is contactable with the second link-side contact portion, the first pivotable link member is pivoted by the pedal-side contact portion pressing the first contacted portion while the brake pedal is stepped on, simultaneously the second contacted portion being moved away from the second link-side contact portion, and the first pivotable link member is pivoted by the second link-side contact portion Dressing the second contacted portion while the actuator is operated, simultaneously the first contacted portion being moved away from the pedal-side contact portion, wherein the actuator is a hydraulic cylinder, and wherein the automatic brake device includes a pivot shaft that pivotably supports the brake pedal, the first pivotable link member, and the second pivotable link member, the first pivotable link member is fixed to the pivot shaft and pivotable with the pivot shaft, and the automatic brake device further includes a pivot amount detector that is configured to detect an amount of pivoting of the pivot shaft.

* * * * *